United States Patent Office 3,198,483
Patented Aug. 3, 1965

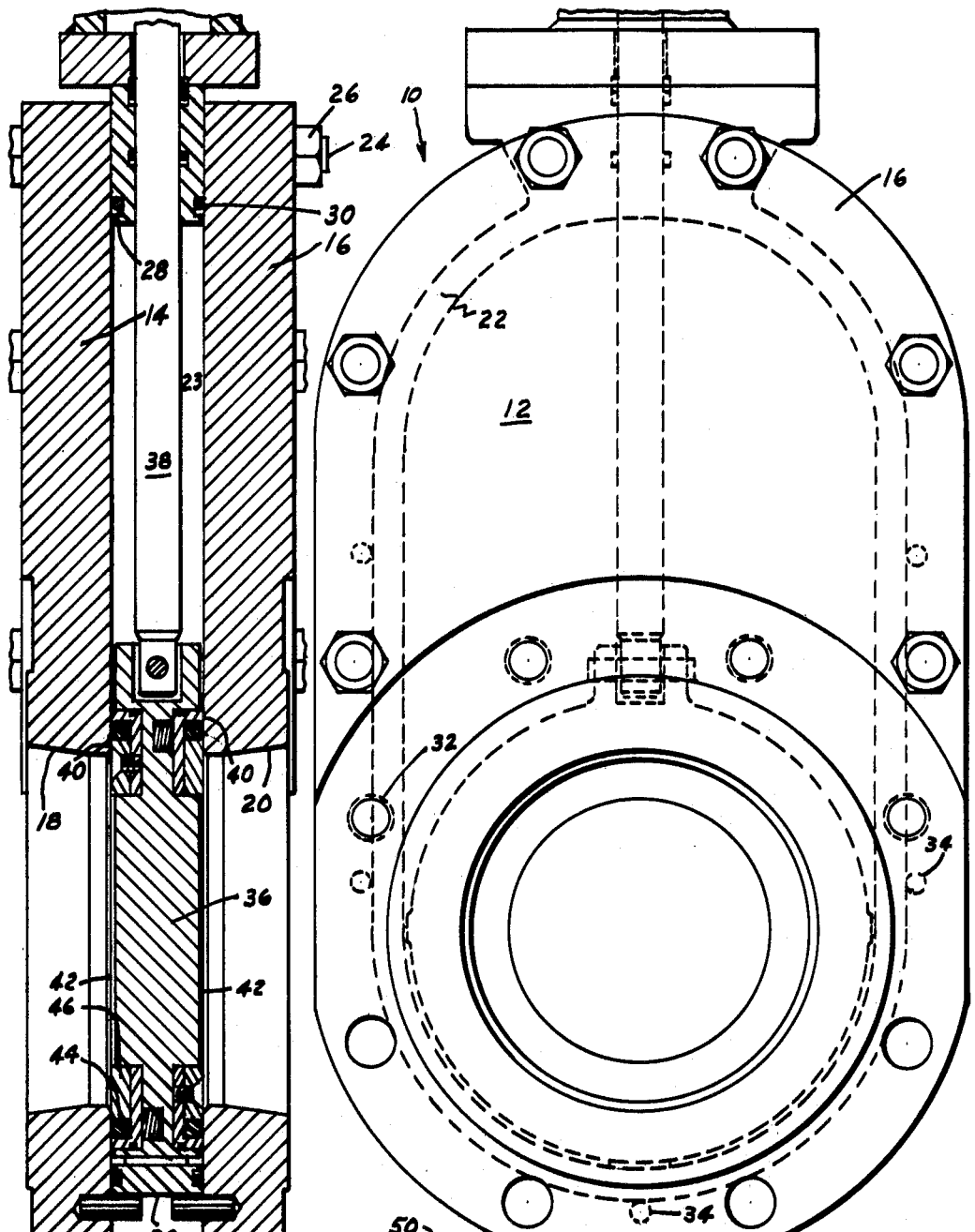

3,198,483
RESILIENT SEAL MEMBERS OF ELONGATED CROSS SECTION FOR FLUID-FLOW CONTROL VALVES
John A. Anderson, Oakland, Calif., assignor to Grove Valve and Regulator Company, Oakland, Calif., a corporation of California
Filed Jan. 26, 1962, Ser. No. 168,910
2 Claims. (Cl. 251—327)

This invention relates to seal means for fluid-flow control valves and more particularly to resilient seal members having an elongated cross-section for sealing the valve in its closed position.

Resilient seal rings of the O-ring type and particularly those seal rings having a circular cross section are widely used today in flow control valves to provide a fluid tight seal between working surfaces of cooperating valve parts. Generally, conventional resilient seal rings of the O-ring type are made of natural or synthetic rubber, Teflon, Kel F, nylon and the like. These resilient seal rings are mounted in a recess formed in one of two opposing working surfaces of the cooperating valve parts, that is, either in the valve body or in the movable valve element. Use of resilient seal members obviates the necessity of machining mating surfaces to tolerances sufficiently close to provide a fluid tight seal thereby making possible a substantial saving in the manufacturing cost.

As is well known to those skilled in the art, the sealing action of O-ring type resilient seal rings, after establishment of an initial seal, results from the fluid pressure of the fluid being controlled urging the rings into contact with opposing valve surfaces in the direction of low pressure. The lower the fluid pressure to be controlled, the smaller is the available pressure urging the seal member into sealing contact. To obtain a good seal for low pressure valves it is desirable to utilize a soft resilient seal member of, say, 70 durometers.

For the control of higher fluid pressures, it has been found desirable to utilize a harder material for the seal member to prevent the seal member from being blown out. Such O-ring seal members, which may have a hardness of above 95 durometers, are usually made of a fairly dead synthetic rubber which take a permanent set and shape to the configuration of their accommodating recesses. Additionally, for very high fluid pressure, the recesses are provided with retaining lips to aid in the retention of the seal member. Because of the hardness of such seal member and the permanent set they acquire, there is little if any tendency to roll or twist as the valve element is moved to or from its closed position.

For the control of relatively low pressures with valves which have both an upstream and a downstream seal, or with valves having only a single seal ring and which must seal from either direction, certain problems are encountered. Where upstream and downstream seals are involved, one of those is operating with the flow in the wrong direction if made identical for reversible operation. Accordingly, such valves require recesses having retaining lips to aid seal member retention. There is a maximum permissable distance between the edges of opposing retaining lips for proper retainment of a seal member of given diameter. Furthermore, the maximum length of each retaining lip is limited or else the seal member may be pushed under the retaining lip by the fluid pressure and break the seal. As a consequence thereof, the maximum width of the recess is limited.

Also, for relatively low pressure valves, or valves which are required to control over a wide range of pressures, the hard seal member has been found unsuitable. Instead, an intermediate hardness seal member, say 80 to 95 durometers, has been found more suitable to insure sealing at very low pressures. This intermediate hardness seal member still requires use of retaining lip to prevent blowouts and aid in retention at fluid pressures at the higher end of the range.

Use of intermediate hardness seal member has given rise to rolling and twisting of the seal member during closing and opening of the valve, particularly in the absence of pressure. The twisting is due to non-uniform rolling along the length of the seal member which may result in failure of the seal member as a sealing element. Since the tendency to resist rolling decreases as the ratio of the seal member cross-sectional area to its diameter decreases, this problem is particularly severe in larger size valves. To overcome the tendency to roll, it is therefore necessary to restrain the seal member or to provide a seal member having a sufficiently large cross-sectional area in relation to its diameter and its hardness.

One solution therefore would be to increase the cross-sectional area of the seal member and retain its circular configuration. This solution requires a corresponding increase in the width of its accommodating recess necessitating a larger valve body and valve element. Such an increase in the physical dimensions of the valve is often undesirable.

Another solution would be the utilization of a D shaped seal member in which two corners are added to increase its cross-sectional area. The two corners would engage the bottom of the accommodating recess and restrain it against rolling. Since for a given width of the seal member, there is an allowable maximum width between retaining lips for proper retainment and an allowable maximum length of retaining lips for proper seating which determines the maximum allowable width of the recess, it was found that such a recess did not provide sufficient cross-sectional area to accommodate a D shaped seal member taking into account the necessary inward displacement of the exposed seal member portion upon sealing against the cooperating valve surface.

It has been found that a sealing member's area and its resistance to rolling may be increased by utilizing an elongated, cross-sectional shape whose width may equal the radius of a hard O-ring of circular cross-section so that, with the recess of the same width as that for an O-ring of circular cross section, the elongated sealing member is restrained against rolling. It has also been found that a resilient seal member of elongated cross-section allows more compression along its long dimension than a corresponding seal member of circular cross-section since there is an increased amount of resilient material. Even after such an elongated cross-section seal member has taken a permanent set in accordance with the shape of the accommodating recess, there is still more available compression along the long dimension than has been heretofore possible with circular cross-section seal members. This additional compression allows the use of somewhat harder seal members for sealing at low pressures.

It is therefore a primary object of this invention to provide a resilient sealing member of the O-ring type for a fluid-flow control valve which exhibits greatly increased resistance to rolling and twisting.

It is a further object of this invention to provide a resilient seal member of the O-ring type having a cross-sectional shape particularly suitable to resist rolling or twisting and which may be employed in controlling low fluid pressures. Additionally it is an object of this invention to provide an accommodating recess for such a seal member which prevents it from rolling and securely retains the seal member against forces tending to cause blow-outs at high fluid pressures.

It is still a further object of this invention to provide a reversible fluid-flow control valve particularly suitable for controlling a large range of fluid pressure by means of a valve element movable between an open and a closed position in which the sealing between the valve member and the valve body is provided by a resilient sealing member of the O-ring type which is shaped and mounted to exhibit great resistance to rolling and blow-out and which is sufficiently soft to provide low fluid pressure control.

It is also an object of this invention to provide a flow control device which is versatile, rugged, reliable and economical.

In accordance with the preferred embodiment of this invention a fluid-flow control valve having a valve body with a pair of flow passages and a body space between the flow passages is provided. A gate-type valve element, movable between an open and a closed position, is located in the body space. The valve element has a working surface on each side and the valve body is formed with corresponding working surfaces. The working surfaces of the valve element include a recess which accommodates a seal member of the O-ring type having an elongated cross-sectional shape. Each recess retains its seal member by retaining lips and is shaped to allow loose retainment of the seal member with sufficient control to keep it centered.

The seal member is made of a resilient material which is sufficiently hard to be retained yet sufficiently soft to seal at low pressures. The seal member is formed to have two round end faces and two substantially straight side walls, the side walls being more closely spaced to one another than the round end faces.

Other objects and a better understanding of the present invention may be had by reference to the ensuing detailed description, taken in connection with the accompanying drawing, in which:

FIG. 1 shows a front elevational view illustrating a gate valve incorporating the present invention;

FIG. 2 shows a side elevational view in cross section of the gate valve of FIG. 1; and FIG. 3 shows an enlarged cross-sectional view of the seal member of this invention housed in its accommodating recess.

Referring now to the drawings and particularly to FIGS. 1 and 2 thereof, there is shown, by way of example, a fabricated gate valve which is generally indicated by reference character 10. Gate valve 10 comprises a valve body 12 which includes a body band 22 and a pair of spaced side body plates 14 and 16 having a pair of axially aligned openings 18 and 20 defining flow passages. Side body plates 14 and 16 are clamped together across body band 22 by bolts 24 and nuts 26. Suitable sealing means such as resilient O-rings 28 and 30 housed in suitable recesses in body band 22 are provided to fluid tightly seal body band 22 with respect to side body plates 14 and 16. The space between side body plates 14 and 16 and within body band 22 defines a body space 23. Outside surface 34 of side body plates 14 and 16 surrounding openings 18 and 20 are machined and formed with holes 32 to receive bolts (not shown) for clamping connecting inflow and outflow pipes or hubs (not shown) to side body plates 14 and 16.

There is also provided a plurality of dowel pins 34 located in suitable sockets in both side body plates 14 and 16 for locating and retaining body band 22. In other words, dowels 34 provide a stop means to align the parts during their assembly and to brace body band 22 against internal pressure during valve operation.

A valve element in the form of gate 36 and movable between an open and a closed position is located in body space 23. Gate 36 is operated by means of valve stem 38 in the customary manner. Valve stem 38 is provide with means on its upper end for raising and lowering gate 36. Such means may comprise a hand wheel, bevel gears or hydraulic means, and it will be understood that the gate valve operating means may be in some other form, e.g., such as a lever.

Opposite sides of gate 36 are provided with flat working surfaces 40 which are opposite to coresponding complementary working surfaces 42 on side body plates 14 and 16. Working surfaces 40 include annular accommodating recesses 44 formed in floating seat rings generally indicated by reference character 46. Floating seat rings of the type here shown are fully described in U.S. Patent No. 2,861,771 in which such seat rings are carried by the valve body.

Instead of providing floating seat rings carried by the gate and forming the recesses in the seat ring, it is within the contemplation of this invention to form recesses directly in the gate in those applications not requiring floating seat rings for an upstream and a downstream seal. Furthermore, the floating seat rings formed with recesses may also be carried by the valve body or the recess may be directly formed in the valve body. Instead of utilizing this invention with a gate valve as illustrated in the drawings, the invention may also be used with ball valves, plug valves, butterfly valves, slide valves and other types of valves.

Recess 44, as is best seen in FIG. 3, comprises a recess bottom 48 and two parallel recess side walls 50 which slope inwardly at the entrance of recess 44 to form a pair of retaining lips 52. Retaining lips 52 provide a constricted recess entrance portion. A resilient seal member 60 having a pair of round end faces 61 and 62 and a pair of opposite side walls 63 and 64, is loosely accommodated in recess 44. The distance between parallel side walls 63 and 64 is smaller than the distance between opposing end faces 61 and 62 so that a seal member having an elongated cross-sectional shape is provided.

An important characteristic of a seal member having such elongated cross-sectional shape is that it has increased resistance to rolling and twisting as compared with a circular cross-section O-ring whose diameter is equal to the width of the elongated cross-section because the width of the accommodating recess remains the same, only its depth being increased to accommodate the long dimension of the seal member cross-section.

More particularly, end faces 61 and 62 may be semicircular about a pair of centers lying on a line which defines the long axis of the cross-sectional area of seal ring 60. Side walls 63 and 64 extend parallel to the long axis. End face 62 engages recess bottom 48 and end face 61 projects out of recess 44 through its restricted opening for engagement with the opposed working surface 42. As can be seen in FIG. 3, a certain amount of clearance is provided between respective side walls 63 and 64 and recess walls 50 so that upon contact of face 61 with working surface 42 seal member 60 may expand as it is compressed somewhat into recess 44.

It is also seen that the constrictive opening provided by retaining lips 52 is smaller than the distance between side walls 63 and 64 so that seal member 60 is securely retained. In certain applications, the space between retaining lips is selected to afford the opportunity to force the seal member into the recess through the lip opening. In other applications, one wall or one lip or both are made removable to facilitate insertion of the seal member.

The inward sloping edges or retaining lip 52 are so dimensioned and positioned that when seal member 60 is inserted, it will be gently urged into recess 44 so that end face 62 contacts recess bottom 48. The distance between opposite walls 50 is kept sufficiently small to prevent sideways displacement of seal member 60 which would break the seal and, hence, sufficiently small to prevent a seal member of elongated radial thickness from rolling in the recess. On the other hand, recess 44 is sufficiently wide so that seal member 60 is loosely accommodated therein to provide pressure communication between opposite side walls through the recess bottom.

It is also worth noting that in addition to the restraint of the seal member resulting from an increase in cross-sectional axial thickness of the seal member without increasing the width of the accommodating recess there are other more obvious advantages found in the selected configuration. Since one of the requirements of a low pressure seal is a relatively soft O-ring type seal member, and since softness is really measured by ease of compressibility per unit length, the increased length of the long dimension makes it possible to utilize a harder material and still obtain substantially the same resilience over the total lengths. In other words, the compressibility per unit length may be decreased and made up for by increase of total length of material to be compressed.

The seal means of this invention may also be employed in connection with recesses formed in working surfaces of cylindrical, conical or spherical configuration as has already been indicated. In connection with such recesses, a seal member similar to seal member 60 would be formed except that its long axis (cross-sectional area) is selected to be perpendicular to the bottom of the recess or the opposed working surface against which it seals.

There has been described a new and novel seal member configuration and an accommodating recess therefor for providing a fluid tight seal for a large range of pressures between opposed working surfaces. The seal member of this invention is shaped in such a manner that its resistance to roll and twist is increased. This is accomplished by providing a cross-section of elongated shape. The seal member of this invention is securely retained, since it is seated in a substantially rectangular recess having substantially the same width as that utilized with rings of circular cross-section. Furthermore, the long dimension of the seal member of this invention provides greater overall resilience so that good low pressure seals are provided.

What is claimed is:

1. In a valve construction comprising a valve body having a pair of flow passages for connection with associated piping, a valve member movable in said valve body transversely across said flow passages between open and closed positions and a pair of annular working surfaces, one on said valve body embracing one of said flow passages and the other on said valve member, said working surfaces being mated and opposed when said valve member is in its closed position;

the combination with said valve construction of a seal assembly comprising:
means forming an annular recess in one of said working surfaces,
said recess being in the form of a channel of substantially rectangular cross-section of a given width with generally parallel side walls, and
a resilient seal ring of the O-ring type loosely carried in said recess,
said seal ring being of generally oval cross-section with side surfaces defining a seal ring width along a minor axis, and curved ends defining a seal ring thickness along a major axis,
said given width of the recess being wider than said seal ring width to enable limited transverse movement and to accommodate distortion thereof under fluid and mechanical pressure,
said seal ring thickness being greater than the depth of its accommodating recess so to be compressed by engagement with the opposed working surface when said valve member is in its closed position,
said given width of the recess being narrower than said seal ring thickness to prevent rolling and twisting of said seal ring under frictional engagement with said opposed working surface as said working surfaces are moved transversely relative to each other during opening and closing of said valve.

2. The combination defined by claim 1 including:
means forming a pair of inwardly projecting retaining lips at the entrance portion of said recess,
the space between said lips being slightly less than said seal ring width.

References Cited by the Examiner

UNITED STATES PATENTS

| Re. 7,048 | 4/76 | Frink | 251—332 X |
|---|---|---|---|
| 2,360,733 | 10/44 | Smith | 251—324 |
| 2,420,104 | 5/47 | Smith | 277—177 X |
| 2,861,771 | 11/58 | Bryant | 251—282 X |
| 2,870,987 | 1/59 | Greenwood | 251—327 |
| 2,908,480 | 10/59 | Hamer | 251—328 |
| 3,000,610 | 9/61 | Bryant | 251—327 |
| 3,069,129 | 12/62 | Grove | 251—327 X |

M. CAREY NELSON, *Primary Examiner.*

ISADOR WEIL, *Examiner.*